United States Patent [19]

Barnard, Jr.

[11] Patent Number: 4,574,728
[45] Date of Patent: Mar. 11, 1986

[54] FILTER DIFFERENTIAL PRESSURE IMPENDING AND BYPASS INDICATOR

[75] Inventor: George B. Barnard, Jr., Newbury Park, Calif.

[73] Assignee: Purolator Technologies Inc., Newbury Park, Calif.

[21] Appl. No.: 618,100

[22] Filed: Jun. 7, 1984

[51] Int. Cl.⁴ .................. G01L 19/12; B01D 35/14
[52] U.S. Cl. .................. 116/267; 116/268; 116/283; 210/130
[58] Field of Search ............ 116/34 R, 204, 221, 116/267, 268, 272, 281, DIG. 25, DIG. 42; 73/146.2, 146.3, 146.8, DIG. 3, DIG. 5; 200/81.9 M, 82 E; 210/90, 130; 137/557; 335/306

[56] References Cited

U.S. PATENT DOCUMENTS

| | | | |
|---|---|---|---|
| 2,671,834 | 3/1954 | Kmiecik | 335/207 |
| 3,128,743 | 4/1964 | Whiting | 116/267 |
| 3,335,694 | 8/1967 | Dwyer et al. | 210/90 |
| 3,815,066 | 6/1974 | Vinal | 335/207 |
| 3,974,795 | 8/1976 | Crisp, Jr. | 116/DIG. 42 |
| 4,153,003 | 5/1979 | Willis | 116/268 |

*Primary Examiner*—Charles Frankfort
*Assistant Examiner*—W. Morris Worth
*Attorney, Agent, or Firm*—Nilsson, Robbins, Dalgarn, Barliner, Carson & Wurst

[57] ABSTRACT

A differential pressure indicator for use with a filter providing dual indication to indicate both a bypass condition as well as an impending bypass condition. The indicator includes a pressure detector in the form of a piston carrying a pair of permanent magnets. A pair of cylinders each carrying a permanent magnet are concentrically disposed around the permanent magnets carried by the piston. As the differential pressure increases, the piston moves pulling the permanent magnets affixed thereto through the concentrically disposed magnets and as a result of magnetic force interaction the concentrically disposed cylinders move to expose first one and then the other of the cylinders to provide the signals representative of the impending bypass as well as bypass differential pressure being sensed.

14 Claims, 5 Drawing Figures

FILTER DIFFERENTIAL PRESSURE IMPENDING AND BYPASS INDICATOR

BACKGROUND OF THE INVENTION

1. Field of the Invention

This invention relates generally to differential pressure detectors and more specifically to such a detector utilizing permanent magnet means with the magnetic fields thereof interacting to provide a signal representative of predetermined differential pressure conditions present in a filter.

2. The Prior Art

It is common in the prior art to provide differential pressure sensing devices which provide a signal such as the extension of a button or the like when the differential pressure across a filter exceeds a certain preset level. The differential pressure reaching the preset level is indicative of the filter being loaded with contaminants and in need of cleaning or replacing. Such devices commonly utilize permanent magnets which are positioned in line within the apparatus such that when the differential pressure present across a piston moves one of the magnets carried by the piston away from the other, the attracting forces between opposite poles of the two magnets is weakened to a degree such that a spring can move the other magnet and, responsive thereto, provide the signal indicating the differential pressure threshold having been reached. Typical of such devices is that disclosed in U.S. Pat. Nos. 2,942,572; 3,077,176; 3,077,854; 3,140,690 and 3,786,332. Typical of such prior art devices is that upon the predetermined differential pressure being reached a bypass valve opens allowing direct flow of unfiltered fluid from the source to the load. Such unfiltered fluid may contain unwanted contaminants that could affect operation of the load.

Under some applications it is desirable to provide a device which will signal the user that the differential pressure of concern has not as yet been reached but that it is impending. Such devices would allow replacement of the filter prior to bypass occurring. Devices of the type shown in the prior art such as that in the above-referred to patents provide only a go/no-go indication and do not provide a dual indication functioning as a caution to the user.

SUMMARY OF THE INVENTION

A differential pressure detector which provides dual indications for differing pressure differentials which includes pressure detecting means movable responsive to a predetermined differential pressure thereacross and carrying permanent magnet means. First and second indicator means each carrying a permanent magnet means is disposed adjacent said first permanent magnet means so that said permanent magnet means are magnetically coupled. As said first permanent magnet means is moved by said pressure detecting means said first and second indicators provide signals representative of the differing pressure differentials.

DETAILED DESCRIPTION

Figure 1:
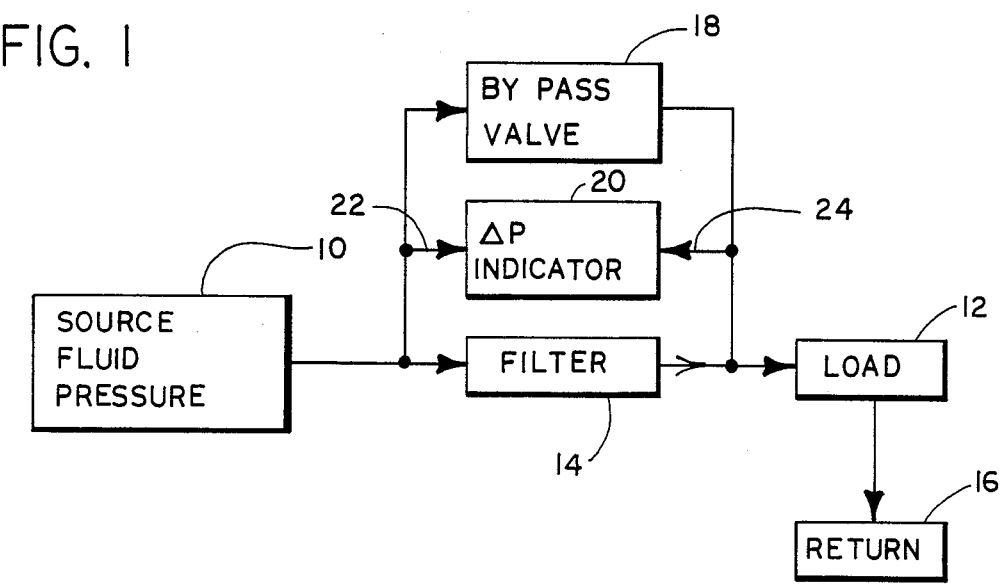
FIG. 1 is a schematic block diagram illustrating an application of a differential pressure indicator constructed in accordance with the present invention.

As is shown in FIG. 1 a source 10 of fluid under pressure is applied to a load 12 through a filter 14. The fluid flows from the load 12 to return 16. To protect the load from contaminants that may exist in the fluid the filter 14 is utilized. In the event the filter becomes loaded with contaminants, a bypass valve 18 will open, permitting the flow of the fluid directly to the load. To provide an indication to the user that the filter 14 is becoming clogged, there is provided a differential pressure ($\Delta p$) indicator 20 which senses the upstream pressure directly from the source by way of being coupled thereto by conduit 22 and on the other side thereof, senses the downstream pressure on the opposite side of the filter by way of being coupled thereto by conduit 24, detects the contamination level of the filter 14. When the filter becomes contaminated to a predetermined level, the pressure across the filter from 22 to 24 reaches a predetermined level at which the indicator 20 will provide a signal such as a pop-up button, light, audible tone, pointer or the like, indicating that the predetermined pressure differential has been reached. In accordance with the present invention, the differential pressure indicator 20 provides two such signals, the first of which is representative of the differential pressure reaching a level which is close to the bypass differential pressure but not yet at that level. Thus it is referred to as an impending bypass differential pressure. The second signal is provided when the bypass differential pressure across the filter has been reached.

Through utilization of the dual indication differential pressure indicator constructed in accordance with the principles of the present invention, the user is in a position such that the filter 14 may be cleaned or replaced as the application requires prior to operation of the bypass valve, thus precluding unfiltered fluid from being applied to the load 12.

Figure 2:
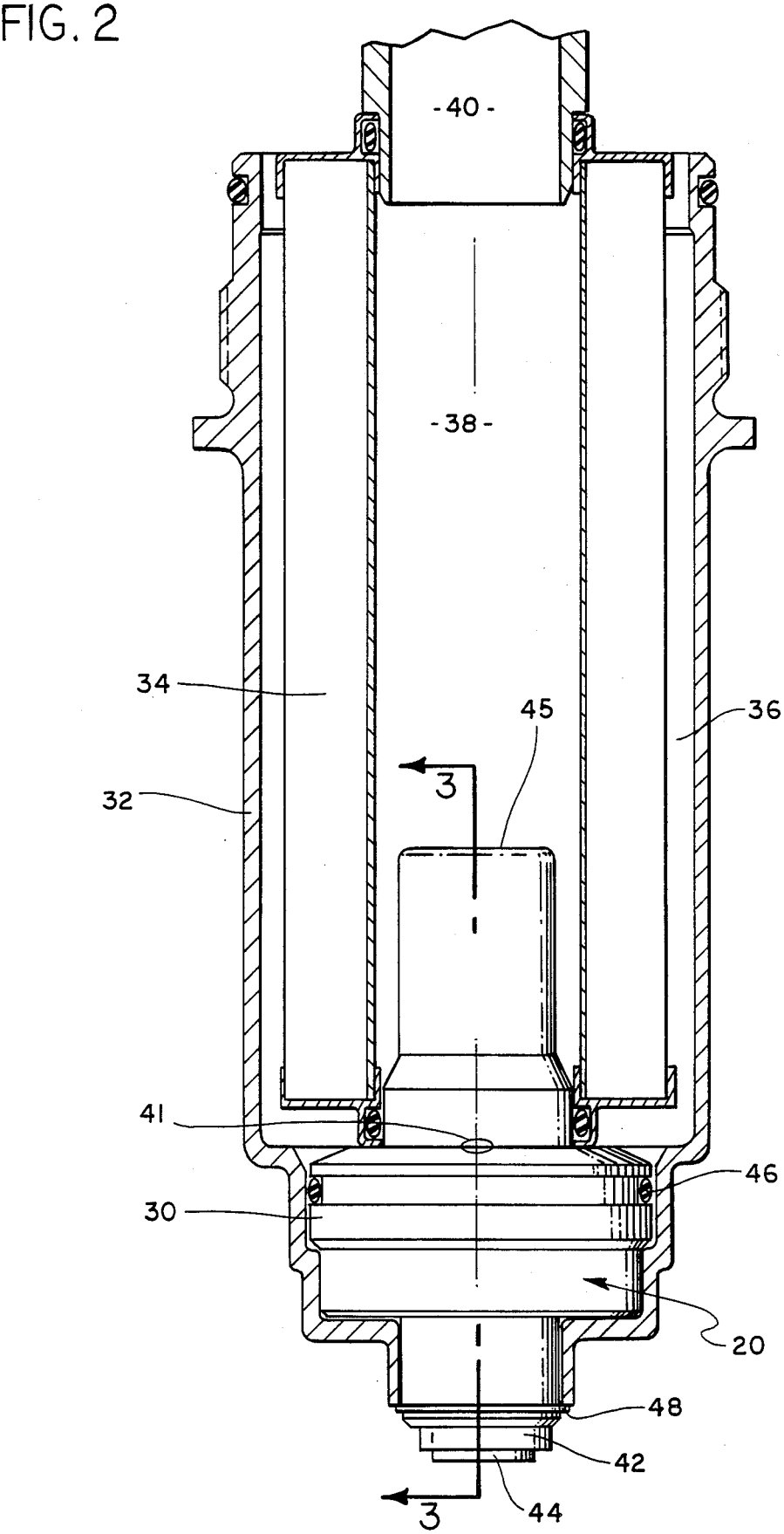
FIG. 2 is a schematic representation of the differential pressure indicator incorporated within a filter housing.

By referring now more specifically to FIG. 2, there is disclosed therein the manner in which the differential pressure indicator 20 may be incorporated with a filter in a particular application. As is therein shown, the differential pressure indicator 20 includes a housing 30 which is inserted within a filter casing 32. A filter element 34 is positioned over the upper portion of the housing 30. As is well known to those skilled in the art, the fluid under pressure to be filtered enters the filter casing 32 and flows from the outside chamber 36 through the filter element 34 and into the inner chamber 38 to then exit through the exit port 40. As is illustrated, the differential pressure indicator housing 30 defines an opening 41 through which the fluid under pressure from the source such as 10, as shown in FIG. 1, enters while the opposite side of the housing as shown at 45, is exposed to the opposite side of the filter element 34 and thus is subjected to the lower pressure after the drop across the filter element 34 has been experienced. As is indicated in the dashed lines extending from the lower portion of the differential pressure indicator 20 there are two signal devices 42 and 44. Only one of these would be visible at any one point in time and then only if the differential pressure is above a predetermined threshold. Typically the indicator 42 represents impending bypass and indicator 44 represents bypass. As is noted there is provided an O-ring 46 to seal the high pressure fluid within the chamber 36 and a retainer ring 48 for holding the differential pressure indicator 20 in place within the casing 32.

Figure 3:
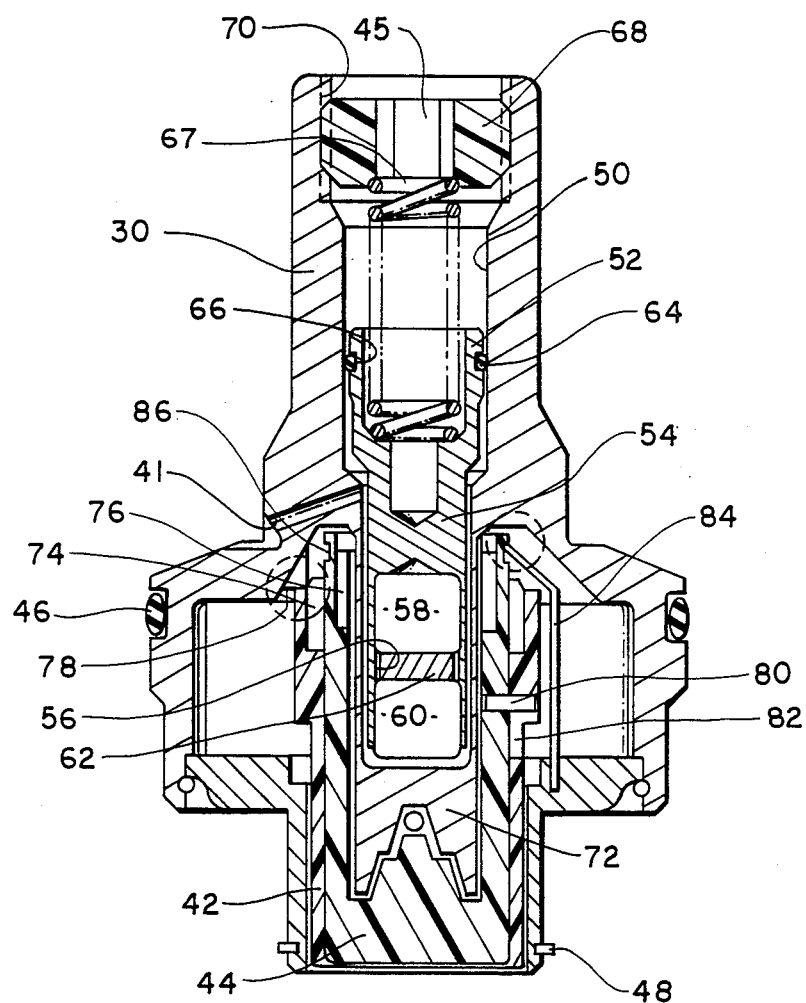
FIG. 3 is a cross sectional view of a differential pressure indicator constructed in accordance with the principles of the present invention and shown in a non-operated position.

By referring now more particularly to FIG. 3 the differential pressure indicator 20 is shown in cross sectional view.

As is shown in FIG. 3 the housing 30 is constructed of non-magnetic material and defines a bore 50 within which there is positioned a differential pressure detector such as a piston 52 also constructed of non-magnetic material. The piston 52 includes a rod 54 extending therefrom which defines a re-entrant bore 56. A pair of permanent magnets 58 and 60, with the north poles oriented upwardly as viewed in FIG. 3, are disposed within the bore 56 and are maintained in a spaced apart position by a non-magnetic material spacer 62. It can thus be seen that the magnets 58 and 60 are carried by the piston 52. An O-ring 64 is retained within a groove 66 defined in the piston wall and engages the bore 50 to seal the high pressure which enters through the opening 41 from the low pressure which enters through the opening 45. It will thus be seen that the piston 52 senses the difference in the pressure on opposite sides of the filter element 34.

Biasing means such as a spring 67 is utilized to establish a threshold force which must be reached before the pressure differential acting across the piston 52 will cause the piston to move within the bore 50. An adjusting nut 68 is threadably received within the threaded opening 70 at the top of the housing 30 and is used to establish the preload generated by the spring 67 upon the piston 52. That is, the nut 68 may be advanced or retracted by insertion of a tool into the opening 45 to increase or decrease, respectively, the bias on the piston 52 thereby establishing the differential pressure operating threshold.

The indicators 42 and 44 are hollow members constructed of lightweight non-magnetic material, preferably of plastic material, and in the form of hollow cylinders as illustrated. The indicators 42 and 44 are concentrically disposed relative to each other and to the lower portion 72 of the housing 30 within which the magnets 58 and 60 are disposed. As is illustrated, the indicator 42 carries a permanent magnet 74 while the indicator 44 carries a permanent magnet 76 each with the north pole oriented upwardly as viewed in FIG. 3. As is illustrated, the inner portion of the indicators 42 and 44 have an enlarged diameter area within which the magnets are inserted. Typically the magnets 74 and 76 are ring magnets; however, it will be understood that a plurality of bar magnets inserted into appropriate recesses provided in the indicators 42 and 44 would function equivalently to the ring magnets 74 and 76.

As is illustrated in FIG. 3 each of the magnets 58, 60, 74 and 76 is oriented with the north poles facing in the same direction and are also disposed so that the magnetic fields emanating from the magnets are interactive. The magnets 74 and 76 are disposed so that they are magnetically interlocked together and when one of the indicators 42-44 moves the other will be carried with it unless physical force such as a stop is utilized to preclude travel of the indicators. The magnet 76 is chosen so that the magnetic field generated by it is greater than the field generated by the magnet 74. In turn, the magnets 58 and 60 each generate a magnetic field which is greater than the magnetic field generated by the magnet 76. However, since the force exerted by a magnet decreases as the square of the distance, the forces exerted by the magnets 58 and 60 is insufficient to overcome the interlocking force between magnets 74 and 76.

As is shown in FIG. 3 the north pole of the magnet 58 is attracting the south pole of the magnet 76 thus urging the indicator 44 in an upward direction. It will also be noted that the magnets 76 and 74 are oriented in such a manner that they are locked together by the north pole of magnet 74 being positioned adjacent the south pole of magnet 76. A shoulder 78 formed on the housing 30 abuts the upper edge of the indicator 42 precluding further movement thereof in an upwardly direction as viewed in FIG. 3. A stop pin 80 rides within a slot 82 formed in the wall of the indicator member 42. As is illustrated the stop pin 80 is at the upper edge of the slot 82 thus preventing any further upward movement of the indicator 44. As will thus be appreciated the interaction of the magnetic fields of the magnets 58, 60, 74 and 76 urging the indicators 42 and 44 upwardly along with the stops 78 and 80-82 precluding further upward movement, retain the indicators in the non-activated position as shown in FIG. 3.

In addition to the foregoing a bimetallic member 84 is provided which prevents operation of the device when the fluid is viscous due to low temperature as shown by interaction with a groove 86 provided about the upper edge of the indicator 44. When the device has been operated for a time such that the fluid being filtered has reached the operational temperature the bimetallic arm 84 will move into a position such that it is out of contact with the groove 86 as is shown more particularly in FIGS. 4 and 5, thus permitting the device to operate.

Figures 4, 5:
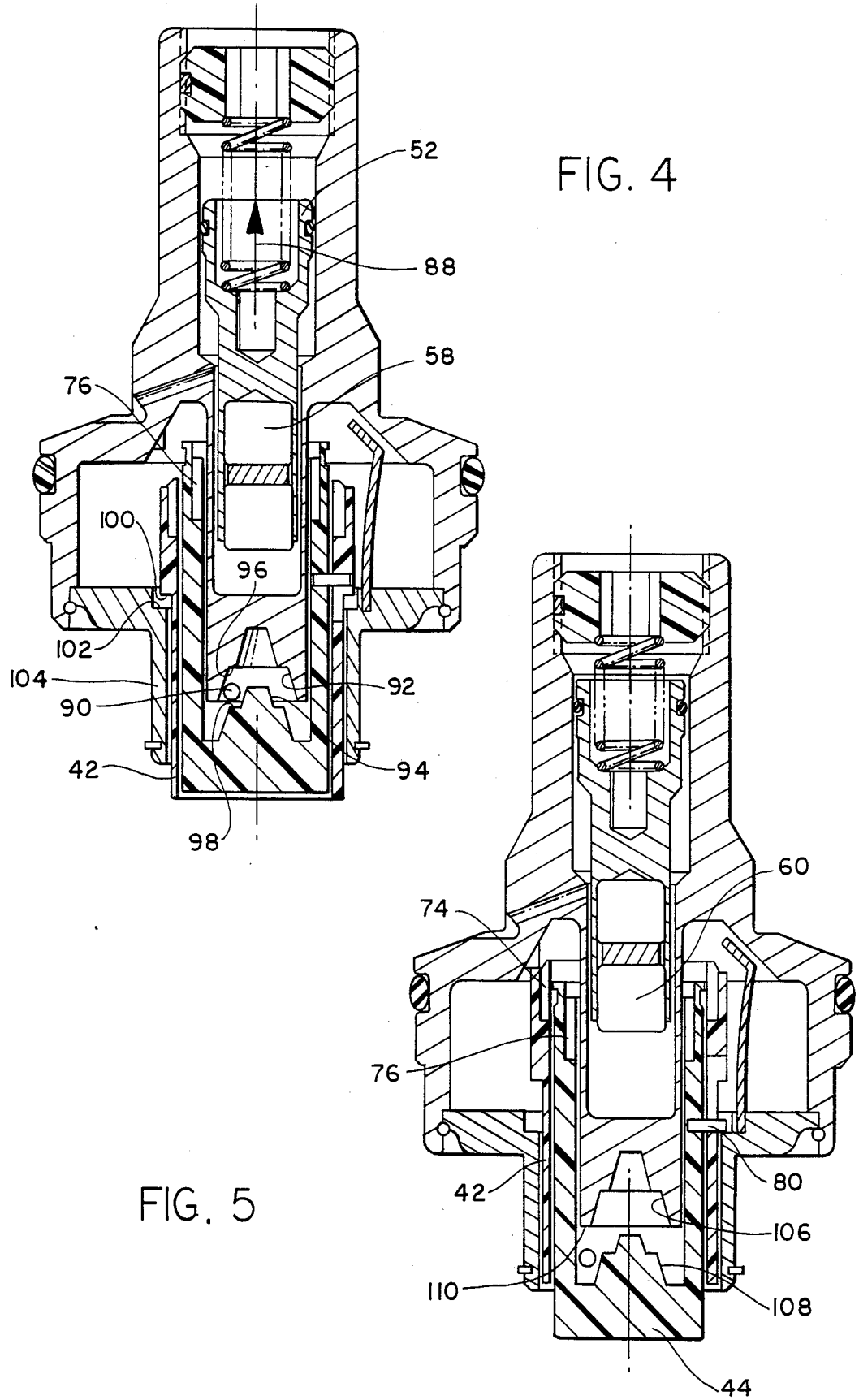
FIG. 4 is a cross sectional view similar to that shown in FIG. 2 but illustrating the indicator in a first position representative of an impending bypass condition.
FIG. 5 is a cross sectional view similar to that of FIG. 1 but showing the structure in a fully operated position representative of bypass differential pressure having been detected.

Referring now more particularly to FIG. 4 the device as illustrated in FIG. 3 is shown in a position where impending bypass is present. As is illustrated in FIG. 4 the piston 52 has moved upwardly as illustrated by the arrow 88 as a result of the pressure differential across the piston reaching a predetermined threshold level set by the spring 67. As the piston 52 moves upwardly the magnet 58 is pulled upwardly relative to the magnet 76. As the center line of the magnet 58 passes the center line of the magnet 76 the magnetic fields emanating from the respective north poles of the magnets 58 and 76 will repel each other causing the indicator 44 to move downwardly as viewed in FIG. 4 until such a time as the north pole of the magnet 76 is attracted by the south pole of the magnet 58 thus effectively locking the two magnets together magnetically. Since the magnets 74 and 76 are locked together the indicator 42 will move with the indicator 44.

When the indicator 44 is moved downwardly as illustrated in FIG. 4, a ball 90 of non-magnetic material is dropped from the position shown in FIG. 3 which is the reset position into a position between the surfaces 92 and 94 defined by the lower portion 72 of the housing 30 and the closed end of the indicator 44. The ball 90 in the position as shown in FIG. 4 locks the indicators 42-44 in the position shown and precludes movement thereof upwardly even though the piston 52 may return to the position shown in FIG. 3. Such occurs since the ball 90 wedges between the surfaces 92 and 94 in the event of such attempted movement and is held from further travel in a downwardly or upwardly direction by the shoulders 96 and 98. In the position shown in FIG. 4, the exterior surface of the indicator 42 is visible thus indicating a pressure differential representative of an impending bypass.

If the pressure across the piston 52 increases further the piston continues to travel in the direction illustrated by the arrow 88 and reaches the position as shown in FIG. 5, to which reference is hereby made. As the piston 52 travels further upwardly against the force of the spring 66 the indicators 42 and 44 will attempt to follow as a result of the attraction between the south pole of the magnet 58 and the north pole of the magnet 76. However, the ball 90 wedged between the surfaces and shoulders 92 and 98 precludes movement of the indicator 44. As the piston 52 continues to move, the north pole of the magnet 60 will repel with the north pole of the magnet 76 causing the indicators 42 and 44 to be urged downwardly further. As the indicators 42 and 44 move downwardly, the shoulder 100 (FIG. 4) formed on the outer surface of the indicator 42 engages the stop 102 formed on the cover 104 which is attached to the lower portion of the housing 30. The shoulder 100 and stop 102 preclude further downward movement of the indicator 42 but does not preclude further downward movement of the indicator 44. As the indicator 44 continues to move downwardly, the north pole of the magnet 76 attracts the south pole of the magnet 74 causing the indicator 42 to move upwardly and back into the housing 30 until the stop 78 precludes further upward movement thereof. The indicator 44 will continue to move downwardly as a result of the attraction between the north pole of the magnet 76 and the south pole of the magnet 60 until such a time as the pin 80 engages the stop 102, thereby precluding further downward movement of the indicator 44. The apparatus in the position shown in FIG. 5 is such that the end of the indicator 44 now extends from the housing and is representative of a bypass condition existing across the filter. That is, the differential pressure across the filter is such that the filter is contaminated to a degree that it must be replaced or cleaned.

When the bypass condition has been reached and the indicator 44 is in the position shown in FIG. 5, the ball 90 drops downwardly into contact with the inclined surface 106 and inner wall 108 of the closed end of the indicator cylinder 44. If the piston were to be retracted, return of the indicator 44 would be precluded by contact between the ball 90, the surface 106 and 108 and the end edge 110 of the lower portion of the housing 30. It will also be noted that resetting of the indicator by pushing it inwardly in the orientation shown in FIG. 5 is also precluded for the same reason.

Resetting of the indicator can be accomplished only by inverting the assembly to allow the ball 90 to return to the position shown in FIG. 3 and then pushing the indicators 42 and 44 inwardly. Typically, when the filter 34 is removed for cleaning or replacement, the indicator 20 will be removed, inverted and reset. As a result a positive lock of the indicator is provided requiring removal of the unit before it can be reset. Such a structure prevents inadvertent operation of the load with a loaded filter and the system in a bypass condition.

From the foregoing description it will be realized by those skilled in the art that there is provided a hydraulically actuated magnetically controlled structure utilizing three sets of permanent magnet means for urging a pair of indicators in one direction responsive to movement of a differential pressure detector and one of the indicators in the opposite direction in response to further movement of the differential pressure detector as a result of higher differential pressure. In this manner there is provided a positive indication to the user of an impending bypass differential pressure as well as the fact that the bypass pressure has been in fact realized.

What is claimed is:

1. Differential pressure detector providing dual indication of differing pressure differentials comprising:
   pressure detecting means;
   means for coupling sources of fluid pressure to opposite sides of said pressure detecting means for generating forces on said pressure detecting means proportional to differences in pressure between said sources for moving said pressure detecting means responsive to said force differences;
   means for biasing said pressure detecting means to establish a force threshold level below which said pressure detecting means will not move;
   first permanent magnet means including two spaced apart permanent magnets tandemly disposed with north poles oriented in the same direction carried by said pressure detecting means for movement with said pressure detecting means responsive to forces exceeding said threshold level;
   first hollow indicator means for providing a signal responsive to a first difference in pressure in excess of said threshold levels;
   second hollow indicator means for providing a signal responsive to an increase in the difference in pressure beyond said first difference, said first hollow indicator means being concentrically disposed relative said second hollow indicator means;
   second and third permanent magnet means carried by said first and second hollow indicator means respectively and having north poles oriented in the same direction as said first permanent magnet means, said second and third permanent magnet means each being disposed concentrically about and substantially surrounding said first permanent magnet means;
   said first, second and third permanent magnet means being magnetically coupled together for moving said first and second hollow indicators to provide said signals as said first permanent magnet means moves relative to said second and third permanent magnet means.

2. The differential pressure detector as defined in claim 1 wherein said pressure detecting means is a piston constructed of non-magnetic material and includes a piston rod which defines a re-entrant bore therein, said two magnets being disposed within said bore.

3. The differential pressure detector as defined in claim 2 which further includes spacer means of non-magnetic material between said two magnets to maintain said two magnets spaced apart.

4. The differential pressure detector as defined in claim 1 wherein said second and third permanent magnet means are ring magnets and the north poles of said ring magnets are oriented in the same direction as the north poles of said two magnets.

5. The differential pressure detector as defined in claim 4 wherein said first and second hollow indicator means are non-magnetic hollow members.

6. The differential pressure detector as defined in claim 5 wherein said hollow members are, through the interaction of the magnetic fields of said first, second and third magnet means, urged in a first direction by movement of said first permanent magnet means in one direction and thereafter said hollow members are urged in a direction opposite said first direction by further movement of said first permanent magnet means in said one direction.

7. The differential pressure detector as defined in claim 6 which further includes stop means to preclude substantial movement of said first and second indicator means in said opposite direction absent further movement of said first permanent magnet means in said one direction.

8. The differential pressure detector as defined in claim 7 wherein said second indicator means is urged to move in said first direction responsive to further movement of said first permanent magnet means in said one direction.

9. The differential pressure detector of claim 1 wherein said second and third permanent magnet means are magnetically interlocked and move together, absent mechanical restraint, responsive to movement of said two magnets.

10. The differential pressure detector of claim 9 wherein said second and third permanent magnet means each includes a plurality of bar magnets with the north poles thereof oriented in the same direction as the north poles of said two magnets.

11. The differential pressure detector of claims 4 or 10 wherein said first and second indicator means are concentrically disposed hollow members having adjacent ends defining recesses, said second and third permanent magnet means being disposed in said recesses in said first and second indicators, respectively.

12. The differential pressure detector of claim 11 which further includes first and second stop means for limiting the travel in said first direction of said first and second indicator means respectively responsive to movement of said two permanent magnets.

13. The differential pressure detector as defined in claim 7 wherein said pressure detecting means includes a housing defining a bore receiving said pressure detecting means and having one end closed and wherein said stop means includes a pair of opposed shoulders defined by said one end and said second indicator and a ball of non-magnetic material.

14. The differential pressure detector as defined in claim 13 which further includes a second pair of opposed shoulders defined by said one end and said second indicator whereby contact between said ball and said second pair of opposed shoulders precludes only said second indicator moving substantially in said opposite direction.

* * * * *